United States Patent
Shi et al.

(10) Patent No.: US 11,737,139 B2
(45) Date of Patent: Aug. 22, 2023

(54) COMMUNICATION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Cong Shi, Guangdong (CN); Yanan Lin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 228 days.

(21) Appl. No.: 17/196,620

(22) Filed: Mar. 9, 2021

(65) Prior Publication Data
US 2021/0195644 A1 Jun. 24, 2021

Related U.S. Application Data

(63) Continuation of application No. PCT/CN2018/104832, filed on Sep. 10, 2018.

(51) Int. Cl.
| | |
|---|---|
| H04W 74/08 | (2009.01) |
| H04W 76/27 | (2018.01) |
| H04W 72/1268 | (2023.01) |
| H04W 74/00 | (2009.01) |
| H04W 72/23 | (2023.01) |
| H04W 72/50 | (2023.01) |

(52) U.S. Cl.
CPC ... *H04W 74/0816* (2013.01); *H04W 72/1268* (2013.01); *H04W 72/23* (2023.01); *H04W 72/535* (2023.01); *H04W 74/004* (2013.01); *H04W 76/27* (2018.02)

(58) Field of Classification Search
CPC ............. H04W 74/0816; H04W 76/27; H04W 72/1257; H04W 74/004
See application file for complete search history.

(56) References Cited

U.S. PATENT DOCUMENTS

| | | | |
|---|---|---|---|
| 2013/0170447 A1 | 7/2013 | Lin et al. | |
| 2017/0289869 A1* | 10/2017 | Nogami | ................ H04L 5/0094 |
| 2018/0132264 A1* | 5/2018 | Jung | ..................... H04L 5/0055 |
| 2018/0235005 A1* | 8/2018 | Ansari | .............. H04W 74/0808 |

FOREIGN PATENT DOCUMENTS

| | | | |
|---|---|---|---|
| CN | 101715237 A | 5/2010 | |
| CN | 102104962 A | 6/2011 | |
| CN | 108270527 A | 7/2018 | |

(Continued)

OTHER PUBLICATIONS

The international search report of PCT application No. PCT/CN2018/104832, dated Mar. 4, 2019.

(Continued)

*Primary Examiner* — Kevin M Cunningham
(74) *Attorney, Agent, or Firm* — Ladas & Parry LLP

(57) ABSTRACT

Provided in embodiments of the present disclosure are a wireless communication method and a device capable of reducing communication delay. The method includes: a terminal device transmitting uplink data to a network device using at least one of multiple uplink resources, where the multiple uplink resources are indicated by a dynamic scheduling instruction.

16 Claims, 5 Drawing Sheets

(56) References Cited

FOREIGN PATENT DOCUMENTS

WO     2018082561  A1     5/2018

OTHER PUBLICATIONS

The EESR of corresponding European application No. 18933563.1, dated Sep. 23, 2021.
Ericsson: "Multi-subframe scheduling design for Enhanced LAA", 3GPP Draft; R1-165142, 3rd Generation Partnership Project (3GPP), Mobile Competence Centre; 650, Route Des Lucioles; F-06921 Sophia-Antipous Cedex; France, vol. RAN WG1. No. Nanjing, China; May 23 -May 27, 2016 May 14, 2016(May 14, 2016), XP051089837.
Institute for Information Industry(III): "Discussion on LAA Uplink Channel Access", 3GPP Draft; R1-163191 Discussion On LAA Uplink Channel Acceess_R1, 3rd Generation Partnership Project (3GPP), Mobile Competence Centre; 650, Route Des Lucioles; F-06921 Sophia-Antipolis Cedex; Fran, vol. RAN WG1, No. Busan, Korea: Apr. 11,-Apr. 15, 2016 Apr. 1, 2016(Apr. 1, 2016), XP051079790.
Intel Corporation:"Random access procedure far NR-u", 3GPP Draft; R2-1811663-RACHUPDATE-NRU_V00, 3rd Generation Partnership Project (3GPP), Mobile Competence Centre; 650, Route Des Lucioles; F-06921 Sophia-Antipous Cedex; France, vol. RAN WG2, No. Gothenburg, Sweden; Aug. 20-Aug. 24, 2018 Aug. 10, 2018(Aug. 10, 2018), XP051521306.
The first Office Action of corresponding Chinese application No. 201880097379.9, dated Nov. 18, 2022.
LG Electronics, Uplink resource request for uplink scheduling, R1-062318,3GPP TSG RAN WG1 #46, Tallinn, Estonia, Aug. 28-Sep. 1, 2006.

* cited by examiner

COMMUNICATION METHOD, TERMINAL DEVICE, AND NETWORK DEVICE

CROSS-REFERENCE TO RELATED DISCLOSURES

This application is a continuation of International Application No. PCT/CN2018/104832 filed on Sep. 10, 2018, the content of which is incorporated herein by reference in its entirety.

TECHNICAL FIELD

The present disclosure relates to the field of communications and, in particular, to a communication method, a terminal device and a network device.

BACKGROUND

In a long term evolution (Long Term Evolution, LTE) system, a network device may transmit downlink control information (Downlink Control Information, DCI) to a terminal device, where the DCI may indicate an uplink resource for the terminal device to transmit uplink data.

In a new radio (New Radio, NR) system, requirements on communication latency are relatively high.

Therefore, in the NR system, it is an urgent problem to be solved with regard to how to reduce the communication latency in terms of uplink data transmission.

SUMMARY

Embodiments of the present disclosure provide a wireless communication method and device capable of reducing communication latency.

In a first aspect, provided is a communication method, including: transmitting, by a terminal device, uplink data to a network device using at least one of multiple uplink resources, where the multiple uplink resources are indicated by a dynamic scheduling instruction.

In a second aspect, provided is a wireless communication method, including: receiving, by a network device over at least one of multiple uplink resources, uplink data transmitted by a terminal device, where the multiple uplink resources are indicated in a dynamic scheduling instruction.

In a third aspect, provided is a wireless communication method, including: transmitting, by a terminal device, uplink data to a network device using an uplink resource, where the uplink resource is indicated by a dynamic scheduling instruction for scheduling downlink data.

In a fourth aspect, provided is a wireless communication method, including: receiving, by a network device over an uplink resource, uplink data transmitted by a terminal device, where the uplink resource is indicated by a dynamic scheduling instruction for scheduling downlink data.

In a fifth aspect, provided is a terminal device configured to execute the method described above in the first aspect or the third aspect.

Specifically, the device includes a functional module configured to execute the method described above in the first aspect or the third aspect.

In a sixth aspect, provided is a network device configured to execute the method described above in the second aspect or the fourth aspect.

Specifically, the device includes a functional module configured to execute the method described above in the second aspect or the fourth aspect.

In a seventh aspect, provided is a terminal device, including: a processor and a memory, where the memory is configured to store a computer program, and the processor is configured to call and run the computer program stored in the memory to execute the method described above in the first aspect or the third aspect.

In an eighth aspect, provided is a network device, including: a processor and a memory, where the memory is configured to store a computer program, and the processor is configured to call and run the computer program stored in the memory to execute the method described above in the second aspect or the fourth aspect.

In a ninth aspect, provided is a chip for implementing the method described above in any one of the first aspect to the fourth aspect.

Specifically, the chip includes: a processor, configured to call and run a computer program from a memory in such a manner that a device installed with the chip executes the method described above in any one of the first aspect to the fourth aspect.

In a tenth aspect, provided is a computer readable storage medium configured to store a computer program that enables a computer to execute the method described above in any one of the first aspect to the fourth aspect.

In an eleventh aspect, provided is a computer program product including a computer program instruction that enables a computer to execute the method described above in any one of the first aspect to the fourth aspect.

In a twelfth aspect, provided is a computer program which, when running on a computer, enables the computer to execute the method described above in any one of the first aspect to the fourth aspect.

Therefore, a network device may indicate multiple uplink resources in a dynamic scheduling instruction, and a terminal device may transmit uplink data using at least part of the multiple uplink resources. Since there are multiple uplink resources available for uplink data transmission, when there is only one uplink resource, it is possible to avoid latency resulting from a need to continue to wait for scheduling due to possible unavailability of the one uplink resource, moreover, and since there are multiple uplink resources available for selection, it is possible to improve reliability of data transmission.

DESCRIPTION OF EMBODIMENTS

Technical solutions in embodiments of the present disclosure will be described hereunder in detail with reference to the accompanying drawings in the embodiments of the present disclosure. Obviously, the described embodiments are a part of embodiments of the present disclosure, rather than all embodiments of the present disclosure. Based on the embodiments in the present disclosure, all other embodiments obtained by those of ordinary skill in the art without any creative effort should fall into the scope claimed in the present disclosure.

The technical solutions in the embodiments of the present disclosure can be applied to various communication systems, for example, a global system of mobile communication (Global System of Mobile communication, GSM), a code division multiple access (Code Division Multiple Access, CDMA) system, a wideband code division multiple access (Wideband Code Division Multiple Access, WCDMA) system, a general packet radio service (General Packet Radio Service, GPRS), a long term evolution (Long Term Evolution, LTE) system, an LTE frequency division duplex (Frequency Division Duplex, FDD) system, LTE time division duplex (Time Division Duplex, TDD), a universal mobile telecommunication system (Universal Mobile Telecommunication System, UMTS), a worldwide interoperability for microwave access (Worldwide Interoperability for Microwave Access, WiMAX) communication system, a 5G system, or the like.

Figure 1:
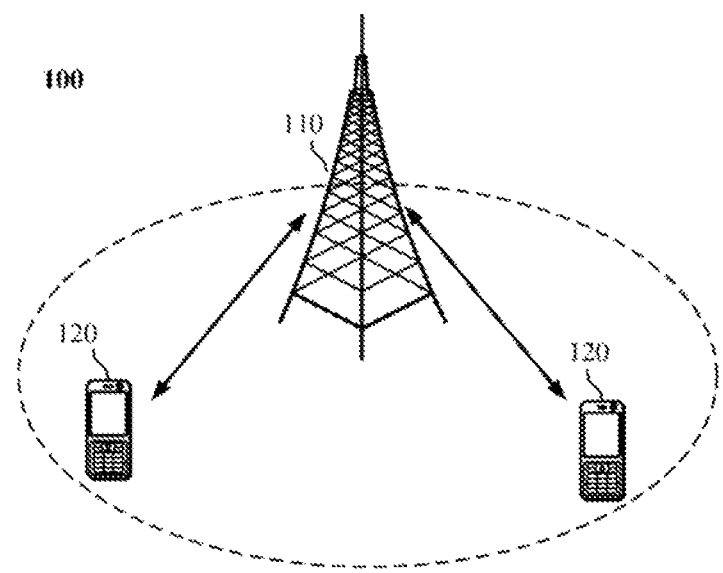
FIG. 1 is a schematic diagram of an architecture of a communication system provided by an embodiment of the present disclosure.

Exemplarily, a communication system 100 applied in an embodiment of the present disclosure is shown in FIG. 1. The communication system 100 may include a network device 110 which may be a device that communicates with a terminal device 120 (or termed as a communication terminal or a terminal). The network device 110 may provide communication coverage for a specific geographic area, and may communicate with a terminal device located in the coverage area. Optionally, the network device 110 may be a base station (Base Transceiver Station, BTS) in the GSM system or the CDMA system, or a base station (NodeB, NB) in the WCDMA system, or also an evolutional base station (Evolutional Node B, eNB or eNodeB) in the LTE system, or a wireless controller in a cloud radio access network (Cloud Radio Access Network, CRAN), alternatively, the network device may be a mobile switching center, a relay station, an access point, a vehicle-mounted device, a wearable device, a hub, a switch, a bridge, a router, a network side device in a 5G network, or a network device in a future evolutional public land mobile network (Public Land Mobile Network, PLMN), etc.

The communication system 100 also includes at least one terminal device 120 located within the coverage area of the network device 110. The "terminal device" as used herein includes but not limited to: device connected via a wired line, e.g., connected via a public switched telephone network (Public Switched Telephone Networks, PSTN), a digital subscriber line (Digital Subscriber Line, DSL), a digital cable, or a direct cable; and/or device connected via another data connection/network; and/or device connected via a wireless interface. e.g., connected via a cellular network, a wireless local area network (Wireless Local Area Network, WLAN), a digital TV network such as a DVB-H network, a satellite network, and an AM-FM broadcast transmitter; and/or an apparatus for another terminal device provided to receive/transmit communication signals; and/or an internet of things (Internet of Things, IoT) device. The terminal device provided to perform communications through the wireless interface may be termed as a "wireless communication terminal", a "wireless terminal", or a "mobile terminal". Examples of the mobile terminal include, but are not limited to, a satellite or a cellular telephone; a personal communications system (Personal Communications System, PCS) terminal capable of combining a cellular radio telephone with data processing, facsimile, and data communication capability; a PDA that may include a radio telephone, a pager, Internet/intranet access, a web browser, a notepad, a calendar, and/or a global positioning system (Global Positioning System, GPS) receiver; and a conventional laptop and/or handheld receiver or other electronic apparatuses including a radio telephone transceiver. The terminal device may refer to an access terminal, user equipment (User Equipment, UE), a subscriber unit, a subscriber station, a mobile station, a mobile platform, a remote station, a remote terminal, a mobile device, a user terminal, a terminal, a wireless communication device, a user agent or a user apparatus. The access terminal may be a cellular telephone, a cordless telephone, a session initiation protocol (Session Initiation Protocol, SIP) telephone, a wireless local loop (Wireless Local Loop, WLL) station, a personal digital assistant (Personal Digital Assistant, PDA), a handheld device with wireless communication functions, a computing device or other processing devices connected to a wireless modem, a vehicle-mounted device, a wearable device, a terminal device in the 5G network, or a terminal device in the future evolutional PLMN, etc.

Optionally, device to device (Device to Device, D2D) communication may be performed between terminal devices 120.

Optionally, the 5G system or the 5G network may also be referred to as a new radio (New Radio, NR) system or an NR network.

FIG. 1 exemplarily shows one network device and two terminal devices. Optionally, the communication system 100 may include multiple network devices and each network device may include other number of terminal devices within its coverage area, but the embodiments of the present disclosure are not limited thereto.

Optionally, the communication system 100 may also include other network entities such as a network controller, a mobility management entity, etc., but the embodiments of the present disclosure are not limited thereto.

It should be understood that the devices with communication functions in the network/system in the embodiments of the present disclosure may be termed as communication devices. Taking the communication system 100 shown in FIG. 1 as an example, the communication devices may include the network device 110 and the terminal device 120 that have communication functions, and the network device 110 and the terminal device 120 may be specific devices described above, and details will not be described herein again. The communication devices may also include other devices in the communication system 100, for example, other network entities such as a network controller, a mobility management entity, etc., which is not limited in the embodiments of the present disclosure.

Figure 2:
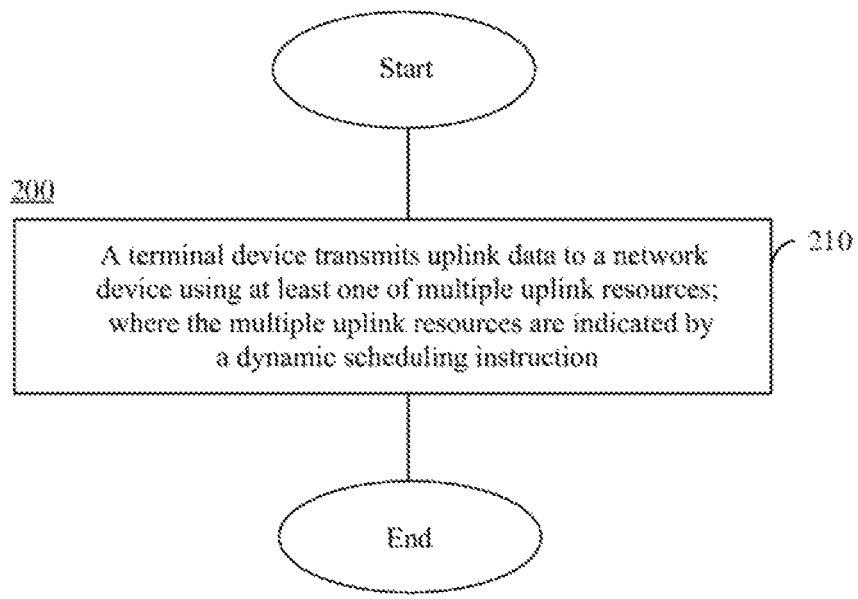
FIG. 2 is a schematic diagram of a wireless communication method provided by an embodiment of the present disclosure.

FIG. 2 is a schematic flowchart of a wireless communication method 200 according to an embodiment of the present disclosure. The method 200 includes at least part of the following contents.

In 210, a terminal device transmits uplink data to a network device using at least one of multiple uplink resources, where, the multiple uplink resources are indicated by a dynamic scheduling instruction, or indicated by a resource position of downlink data that has been received before the uplink data is transmitted.

Specifically, the network device may indicate multiple uplink resources in a dynamic scheduling instruction, and the terminal device may transmit uplink data using at least part of the multiple uplink resources; alternatively, a resource position of downlink data that has been received before the uplink data is transmitted may indicate multiple uplink resources, and the terminal device may transmit uplink data using at least part of the multiple uplink resources. Since there are multiple uplink resources available for uplink data transmission, when there is only one uplink resource, it is possible to avoid latency resulting from a need to continue to wait for scheduling due to possible unavailability of the one uplink resource, and since there are multiple uplink resources available for selection, it is possible to improve reliability of data transmission.

Figure 3:
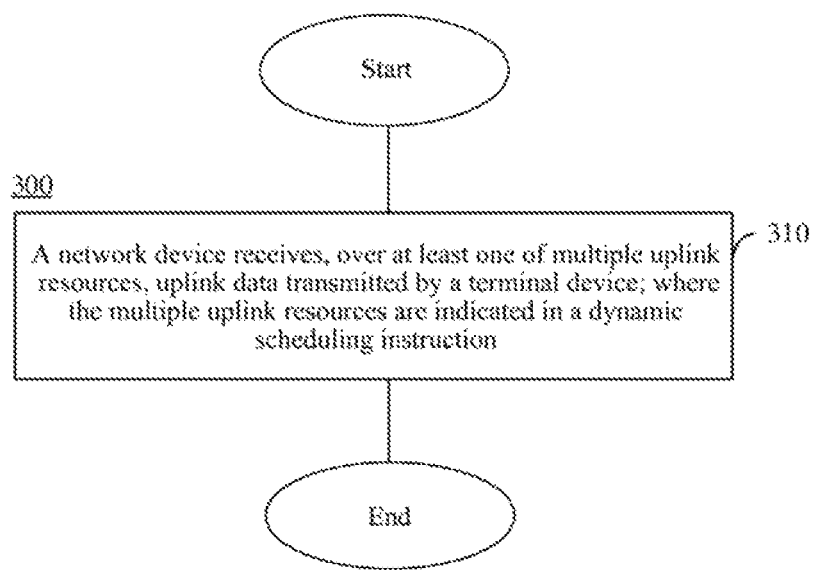
FIG. 3 is a schematic diagram of a wireless communication method provided by an embodiment of the present disclosure.

FIG. 3 is a schematic flowchart of a wireless communication method 300 according to an embodiment of the present disclosure. The method 300 includes at least part of the following contents.

In 310, a network device receives, over at least one of multiple uplink resources, uplink data transmitted by a terminal device, where, the multiple uplink resources are indicated in a dynamic scheduling instruction, or are indicated by a resource position of downlink data that has been transmitted before the uplink data is received.

Specifically, a dynamic scheduling instruction for the network device to schedule the terminal device may indicate multiple uplink resources, alternatively, a resource position of downlink data that has been transmitted before uplink data is received may indicate multiple uplink resources, and the terminal device may transmit uplink data using at least part of the multiple uplink resources, accordingly, the network device may receive the uplink data over at least part of the multiple uplink resources. Since there are multiple uplink resources available for uplink data transmission, when there is only one uplink resource, it is possible to avoid latency resulting from a need to continue to wait for scheduling due to possible unavailability of the one uplink resource, moreover, and since there are multiple uplink resources available for selection, it is possible to improve reliability of data transmission.

For ease of more clearly understanding the present disclosure, the solutions in the embodiments of the present disclosure will be described hereunder in detail. The following description can be applied to the method 200 and can also be applied to the method 300.

It should be understood that all data to be transmitted can be transmitted over the one uplink resource mentioned in the embodiment of the present disclosure, for example, all uplink data scheduled at one time.

If the terminal device transmits uplink data using one uplink resource, then, at this time, the uplink data may be transmitted once; if two or more uplink resources are used to transmit uplink data, then, at this time, the uplink data may be repeatedly transmitted for twice or more.

Optionally, the multiple uplink resources in the embodiment of the present disclosure may not overlap at all in the time domain, or there may be a case that at least part of the resources overlaps fully or partially in the time domain.

Optionally, the dynamic scheduling instruction mentioned in the embodiment of the present disclosure is downlink control information (Downlink Control Information, DCI) or a random access response.

Optionally, the uplink data mentioned in the embodiment of the present disclosure may be data carried in a physical uplink shared channel (Physical Uplink Shared Channel, PDSCH), and may be data carried in an uplink control channel (for example, uplink control information (Uplink Control Information, UCI)), and may also be an uplink reference signal (for example, a sounding reference signal (Sounding Reference Signal, SRS)), or a channel or a signal transmitted during a physical random access procedure (for example, Message 3).

Optionally, DCI for indicating multiple uplink resources may carry one uplink grant (UL grant) to indicate the multiple uplink resources, or may carry multiple UL grants having a one-to-one correspondence to the multiple uplink resources.

Optionally, the DCI may be configured to schedule the aforementioned uplink data, where the DC is optionally but not limited to being transmitted to the terminal device based on an SR transmitted by the terminal device, and the DCI may indicate the multiple uplink resources. For example, by means of bit mapping, the multiple uplink resources in a resource set may be indicated, or an offset of at least one of the multiple uplink resources relative to a specific resource (for example, an RRC semi-statically configured periodic resource) and/or an offset between the multiple uplink resources is indicated, or one uplink resource therein (other resources may be determined by the terminal device based on the one uplink resource) may be indicated.

Alternatively, the DCI may be configured to schedule downlink data (it may be DCI for scheduling downlink data received the last time before transmission of the uplink data), and the DC may further carry information about the multiple uplink resources. Specifically, the DCI carries bits indicating the multiple uplink resources. For example, the multiple uplink resources in a resource set may be indicated by means of bit mapping, or an offset of at least one of the multiple uplink resources relative to a specific resource (for example, an RRC semi-statically configured periodic resource or a resource for the downlink data scheduled by the DCI) and/or an offset between the multiple uplink resources is indicated, or one uplink resource therein (other resources may be determined by the terminal device based on the one uplink resource) may be indicated.

It should be understood that the DC for scheduling the downlink data may also indicate the multiple uplink resources in other manners. For example, the DC may be distinguished for whether to indicate the multiple uplink resources by different scrambling codes or bits that do not carry different values, and when there is a function of indicating the multiple uplink resources, the terminal device may determine the multiple uplink resources according to some other protocol based preset or RRC semi-statically configured information (for example, an offset of at least one of the multiple uplink resources relative to a specific resource (for example, a resource for the downlink data scheduled by the DCI) and/or an offset between the multiple uplink resources).

Optionally, the uplink data mentioned in the embodiment of the present disclosure may be Message 3 during a random access procedure, where the Message 3 may be radio resource control (Radio Resource Control, RRC) signaling, or may include a media access control (Media Access Control, MAC) layer control instruction and possible data, etc. At this time, the dynamic scheduling instruction may be carried in Message 2 during the random access procedure (that is, a random access response message). Before receiving the Message 2 transmitted by the network device, the terminal device may transmit Message 1 to the network device, where the Message 1 may carry a random access preamble.

Where, when the dynamic scheduling instruction is the random access response (which may include an ID (RAPID) of the random access preamble transmitted by the terminal device), the multiple uplink resources are carried in one sub-protocol data unit (Protocol Data Unit, PDU) in one random access response. It should be understood that, in the embodiment of the present disclosure, the resources being carried in the sub-PDU means that information indicating the resources is carried in the sub-PDU.

For example, the multiple uplink resources may have a one-to-one correspondence to multiple UL grants, respectively, then, at this time, one sub-PDU in the random access response may include the multiple UL grants, where the one sub-PDU may be for one terminal device.

For another example, the multiple uplink resources may correspond to one UL grant, then, at this time, one sub-PDU in the random access response may include the one UL grant, where the one sub-PDU may be for one terminal device.

Alternatively, when the dynamic scheduling instruction is the random access response, the multiple uplink resources may be carried in multiple sub-PDUs in the random access response one by one.

For example, the multiple uplink resources may have a one-to-one correspondence to multiple UL grants, respectively, then, at this time, the multiple sub-PDUs in the random access response may include the multiple UL grants, where each sub-PDU carries one UL grant, respectively, and the multiple sub-PDUs may be for one terminal device. RAD IDs corresponding to the multiple UL grants or the multiple sub-PDUs may be the same.

For ease of understanding, an introduction will be made hereunder with regard to how the dynamic scheduling signaling indicates the multiple uplink resources.

In another implementation, the dynamic scheduling instruction indicates the multiple uplink resources in a resource set by means of bit mapping. For example, the resource set may include 5 resources, and then 11001 may be used to indicate that the first, the second, and the fifth one are multiple uplink resources available for transmitting uplink data.

In one implementation, the dynamic scheduling instruction indicates a resource position of one of the multiple uplink resources; then, at this time, the terminal device may determine the resource position of the one uplink resource from the dynamic scheduling instruction; and determine, based on the resource position of the one uplink resource and an offset between the multiple uplink resources, other at least part of uplink resources other than the one uplink resource from the multiple uplink resources. Where, the offset between the multiple uplink resources may also be carried in the dynamic scheduling instruction, or may be semi-statically configured, or may be preset on the terminal device based on a protocol. Correspondingly, the network device determines, based on the resource position of the one uplink resource and the offset between the multiple uplink resources, other at least part of uplink resources other than the one uplink resource from the multiple uplink resources.

In another implementation, the dynamic scheduling instruction may indicate an offset of one of the multiple uplink resources relative to a specific resource and an offset between the multiple uplink resources; then the terminal device determines at least part of the multiple uplink resources based on the offset of the one uplink resource relative to the specific resource (one of periodic uplink resources indicated by RRC signaling, or a resource occupied by downlink data that has been received), and the offset between the multiple uplink resources and a resource position of the specific resource. Correspondingly, the network device may determine at least part of the multiple uplink resources based on the offset of the one uplink resource relative to the specific resource, and the offset between the multiple uplink resources and the resource position of the specific resource.

It should be understood that, in the embodiment of the present disclosure, the dynamic scheduling instruction may also have other ways to indicate the multiple uplink resources. For example, the dynamic scheduling instruction only indicates whether there are multiple uplink resources for uplink transmission of the terminal device, for example, the dynamic scheduling instruction may be distinguished for whether to indicate the multiple uplink resources by different scrambling codes or bits that do not carry different values, and when there is a function of indicating the multiple uplink resources, the terminal device may determine the multiple uplink resources according to some other protocol based preset or RRC semi-statically configured information (for example, an offset of at least one of the multiple uplink resources relative to a specific resource and/or an offset between the multiple uplink resources).

The embodiment of the present disclosure may be used for uplink transmission on an unlicensed spectrum, where the terminal device or the network device transmits data on an unlicensed spectrum to meet requirements of some unlicensed spectrum specifications, such as listening before talking (Listening Before Talking, LBT), that is, the terminal device or the network device may listen to a channel firstly before data transmission. If the detected energy is lower than a certain threshold, then the terminal device or the network device may transmit data on the channel.

The LTE may use an unlicensed spectrum in a supportable manner (Carrier aggregation, CA), that is, a primary cell (Primary Cell, PCell) operates on a licensed spectrum to provide a basic access function and a data transmission function, and a secondary cell (Secondary Cell, SCell) operates on an unlicensed spectrum for use with a data boosting (boosting) purpose. LTE release (Release) 13 only supports a downlink unlicensed spectrum, that is, the SCell operates on the downlink unlicensed spectrum, and for uplink transmission of the terminal device, the uplink transmission is still used. LTE release 14 (Release 14) enhanced licensed-assisted access (enhanced Licensed-Assisted Access, eLAA) extends the SCell in such a manner that the uplink also supports the unlicensed spectrum, and thus restrictions of the unlicensed spectrum also need to be considered for the uplink data transmission.

For operation of the unlicensed spectrum, the NR system needs to consider supporting LAA mode, a dual connectivity (DC, Dual Connectivity) mode, and also a operation mode of stand-alone operation (stand-alone, SA).

Where, for the LAA mode, an NR PCell operates on a licensed spectrum, and an NR SCell operates on an unlicensed spectrum.

For the DC mode, a master node (Master Node, MN) may operate on a licensed spectrum, and a secondary node (Secondary Node, SN) may operate on an unlicensed spectrum.

For the SA mode, all nodes may operate independently on an unlicensed spectrum.

On the unlicensed spectrum, the NR system may realize uplink transmission based on dynamic scheduling, that is, the terminal device may receive the dynamic scheduling instruction transmitted by the network device to obtain an uplink grant (UL grant); and transmit, according to a resource indicated by the UL grant, uplink data over the resource.

Where, during the random access procedure (which may be a contention-based random access procedure, or also be a non-contention-based random access procedure), the Message 3 (MSG3) transmitted by the terminal device is scheduled by an UL grant in the Message 2 (MSG2, that is, a random access response (Random Access Response)) transmitted by the network device.

During transmission of a data channel, the terminal device may obtain an uplink resource that is scheduled by the network device through downlink control information (Downlink Control Information, DCI) by initiating a scheduling request (Scheduling Request, SR), and transmit uplink data and a possible MAC layer control instruction over the uplink resource.

Alternatively, in the NR system, for the unlicensed spectrum, the network device may also semi-statically configure an uplink transmission resource, for example, the uplink transmission resource may be configured through radio resource control (Radio Resource Control, RRC) signaling, and the configured uplink transmission resource may be a periodic resource. Where, for the semi-statically configured uplink resource, it may be active without activation of the DCI that is, when there is uplink data, the uplink resource may be used for performing data transmission. Alternatively, for the semi-statically configured uplink resource, also the uplink resource may be active and available upon reception of a DCI activation instruction.

Regardless of the uplink resource indicated in the dynamic scheduling instruction for uplink transmission or the uplink resource semi-statically configured by the RRC signaling, for the unlicensed spectrum, there is a need to perform an LBT operation on the uplink resource; under a circumstance that the LBT operation is successful, uplink transmission may be performed using the uplink resource; and then under a circumstance that the LBT operation is unsuccessful, the terminal device, for data transmission, needs to re-initiate a request (for example, a random access request or an SR request) or wait until arrival of a next periodic resource, this will increase data latency and increase signaling overheads (for example, transmission of the random access request or the SR request). Therefore, in the embodiment of the present disclosure, multiple uplink resources may be used for uplink transmission of the terminal device so that data transmission latency and signaling overheads may be reduced, and reliability of data transmission may be increased.

Description will be made hereunder in conjunction with the unlicensed spectrum with regard to how to transmit uplink data using at least one of multiple uplink resources.

Specifically, the terminal device may determine a first uplink resource from the multiple uplink resources; perform a listening before talking LBT operation on the first uplink resource; and under a circumstance that the LBT operation performed on the first uplink resource is successful, transmit the uplink data using the first uplink resource.

Correspondingly, the network device may determine a first uplink resource from the multiple uplink resources; and perform, starting from the first uplink resource, a detection on the uplink data over the at least one uplink resource to obtain the uplink data.

Where, if the terminal device only transmits the uplink data over one uplink resource, then, at this time, the network device may also perform a detection on the uplink data over only one uplink resource; if the terminal device transmits the uplink data over more than one uplink resource, at this time, the network device may perform a detection on the uplink data over more than one uplink resource.

Where, for the first uplink resource, the first uplink resource may be determined from the multiple uplink resources based on at least one of the following: an identifier (Identifier, ID) of the terminal device, a code rate of each of the multiple uplink resources, an index of a carrier to which each of the multiple uplink resources belongs, and an index of a band width part to which each of the multiple uplink resources belongs.

For example, the terminal device may select, from the multiple uplink resources, a corresponding resource having a band width part (Band Width Part, BWP) with a maximum or minimum index as the first uplink resource (at this time, the multiple uplink resources may be located in different BWPs), or may select, from the multiple uplink resources, a corresponding resource having a carrier with a maximum or minimum index as the first uplink resource; alternatively, the terminal device may select, from the multiple uplink resources, a corresponding resources having a minimum code rate as the first uplink resource; alternatively, the terminal device may select the first uplink resource by means of a modulus on the identifier of the terminal device.

The ID of the terminal device, the code rate of each of the multiple uplink resources, the index of the carrier to which each of the multiple uplink resources belongs, and the index of the band width part to which each of the multiple uplink resources belongs as described above may be used to select a frequency domain resource, and upon selection of the frequency domain resource, if there are multiple uplink resources, then, at this time a time domain resource may be selected. For example, an uplink resource with time first (for example, the first one of the multiple uplink resources) may be selected.

It should be understood that the terminal device and the network device may use the same way to select the first uplink resource.

That is, the network device may determine the first uplink resource from the multiple uplink resources based on at least one of the following: an ID of the terminal device, a code rate of each of the multiple uplink resources, an index of a carrier to which each of the multiple uplink resources belongs, and an index of a band width part to which each of the multiple uplink resources belongs.

It should also be understood that, in the embodiment of the present disclosure, the terminal device may also use other ways to select the first uplink resource, for example, the terminal device may randomly select an uplink resource or select an uplink resource with time first (for example, the first uplink resource), at this time, the network device may perform, starting from the first uplink resource of the multiple uplink resources, a detection on the uplink data.

Optionally, in the embodiment of the present disclosure, the terminal device may discard transmission of the uplink data under a circumstance that the LBT operation performed on the first uplink resource is unsuccessful. For the network device, under a circumstance that uplink data is not detected over the first uplink resource, it may discard detection of the uplink data.

Alternatively, in the embodiment of the present disclosure, under a circumstance that the LBT operation performed on the first uplink resource is unsuccessful, a second uplink resource may be determined from the multiple uplink resources; an LBT operation is performed on the second uplink resource; under a circumstance that the LBT operation performed on the second uplink resource is successful, the uplink data is transmitted using the second uplink resource. Correspondingly, under a circumstance that the uplink data is not detected over the first uplink resource, the network device performs a detection over a second uplink resource from the multiple uplink resources to obtain the uplink data. Specifically, under a circumstance that the uplink data is detected over the first uplink resource, the network device no longer performs a detection on the uplink data over other time domain resources whose time-domain position is later than the first uplink resource from the multiple uplink resources.

Where, the second uplink resource may be later than the first uplink resource in a time domain (for example, a start position of the second time domain resource is later than a start position of the first time domain resource, but the first time domain resource and the second time domain resource at least partially overlap in time; alternatively, a start position of the second time domain resource is later than an end position of the first time domain resource), if the LBT operation performed on the first uplink resource is unsuccessful, then an LBT operation may be performed on the second uplink resource later than the first uplink resource.

Further, any two of the multiple uplink resources in the embodiment of the present disclosure do not fully overlap in the time domain (for example, a time interval between start positions of two uplink resources adjacent in the time domain is greater than a time needing to perform an LBT operation), LBT operations may be performed on the multiple uplink resources in sequence starting from the first uplink resource, until an uplink resource whose LBT operation is successful is determined for uplink data transmission, where the uplink data transmission may be performed over a subsequent uplink resource, and the uplink resource may also be discarded.

It should be understood that before the LBT operation is performed on the first uplink resource mentioned in the embodiment of the present disclosure, the LBT operation may also be performed on other uplink resources, and the LBT operation performed on the other uplink resources may be unsuccessful or successful (at this time, the uplink data may be transmitted over both the first uplink resource and the other uplink resources).

Optionally, in the embodiment of the present disclosure, under a circumstance that the uplink data is transmitted using the first uplink resource, the terminal device may repeatedly transmit the uplink data using a third uplink resource from the multiple uplink resources, where a start position of the third uplink resource in a time domain is later than a start position of the first uplink resource in a time domain. Correspondingly, under a circumstance that the uplink data is detected over the first uplink resource, the network device detects, over the third uplink resource, the uplink data that is repeatedly transmitted, where a start position of the third uplink resource in a time domain is later than a start position of the first uplink resource in a time domain.

Where, the third uplink resource is located in a first time range in the time domain, and a start time-domain position of the first time range is the start time-domain position of the first uplink resource, and a time length between the start time-domain position and an end time-domain position of the first time range is less than or equal to a predetermined time length. The predetermined time length is optionally a maximum channel occupancy time (Maximum channel occupancy time, MCOT). The predetermined time length is optionally less than or equal to 16 us.

Specifically, under a circumstance that the terminal device successfully performs the LBT operation on the first uplink resource and transmits the uplink data using it, if there is case that one or some other uplink resources are located in the first time range mentioned above, then by default a current channel may not be occupied by other terminal devices, at this time, the uplink data may be transmitted in the one or some other uplink resources, specifically, the uplink data may be repeatedly transmitted.

It should be understood that, under a circumstance that the terminal device successfully performs the LBT operation on the first uplink resource and transmits the uplink data using it, if there is case that one or some other uplink resources are not located in the first time range mentioned above, then the one or some other uplink resources may be discarded, alternatively, an LBT operation may also be performed on the one or some other uplink resources to repeatedly transmit the uplink data under a circumstance that a LBT operation is successful.

Alternatively, under a circumstance that the terminal device successfully performs the LBT operation on the first uplink resource, all other uplink resources with later time domain positions and/or a same time domain position may be discarded.

Optionally, in the embodiment of the present disclosure, the terminal device may perform LBT operations on the multiple uplink resources, respectively; and transmit the uplink data using an uplink resource whose LBT operation is successful from the multiple uplink resources. Correspondingly, the network device may perform detections on the uplink data over the multiple uplink resources, respectively.

Specifically, the terminal device may perform an LBT operation on each of the multiple uplink resources, and transmit the uplink data using all uplink resources whose LBT operations that are performed are successful.

Optionally, the terminal device may perform LBT operations simultaneously on uplink resources with a same time-domain position and different frequency-domain positions and transmit the uplink data using at least part of the uplink resources with the same time-domain position and different frequency-domain positions whose LBT operation is successful. Correspondingly, the network device performs detections on the uplink data over uplink resources with a same time-domain position and different frequency-domain positions simultaneously.

Specifically, for a same time-domain position, there may be some uplink resources with different frequency-domain locations, and the terminal device may perform LBT operations on these uplink resources. When there are two or more resources whose LBT operations successful, the uplink data may be transmitted using all of the two or more uplink resources, or the uplink data may be transmitted using one of them. For example, an uplink resource may be selected based on an ID of the terminal device, a size of an index of a carrier to which the uplink resource belongs, a size of an index of a BWP to which the uplink resource belongs, and a code rate of the uplink resource, etc.

It should be understood that an introduction is made above with regard to the fact that the embodiment of the present disclosure can be used for an unlicensed spectrum, but it should be understood that the embodiment of the present disclosure can also be used for a licensed spectrum, at this time, the terminal device transmits the uplink data over the multiple uplink resources indicated in the dynamic scheduling instruction to further improve reliability of data transmission, alternatively, one of them may be selected to transmit the uplink data based on an actual situation, at this time, flexibility of resource usage for uplink data transmission may be improved.

Alternatively, the uplink resources in the embodiment of the present disclosure may also be a part of the uplink resources belonging to the licensed spectrum and another part of the uplink resources belonging to the unlicensed spectrum.

For example, an uplink resource in the licensed spectrum may be later than an uplink resource in the unlicensed spectrum. Under a circumstance that LBT operations corresponding to uplink resources in the unlicensed spectrum all fail, uplink transmission may be performed using uplink resources in the licensed spectrum. Under a circumstance that uplink resources in the licensed spectrum have LBT operations failure, then, at this time, uplink transmission may be performed using uplink resources in the unlicensed spectrum without using the uplink resources in the licensed spectrum any longer.

Therefore, a network device may indicate multiple uplink resources in a dynamic scheduling instruction, and a terminal device may transmit uplink data using at least part of the multiple uplink resources. Since there are multiple uplink resources available for uplink data transmission, when there is only one uplink resource, it is possible to avoid latency resulting from a need to continue to wait for scheduling due to possible unavailability of the uplink resource, moreover, and since there are multiple uplink resources available for selection, it is possible to improve reliability of data transmission.

Figure 4:
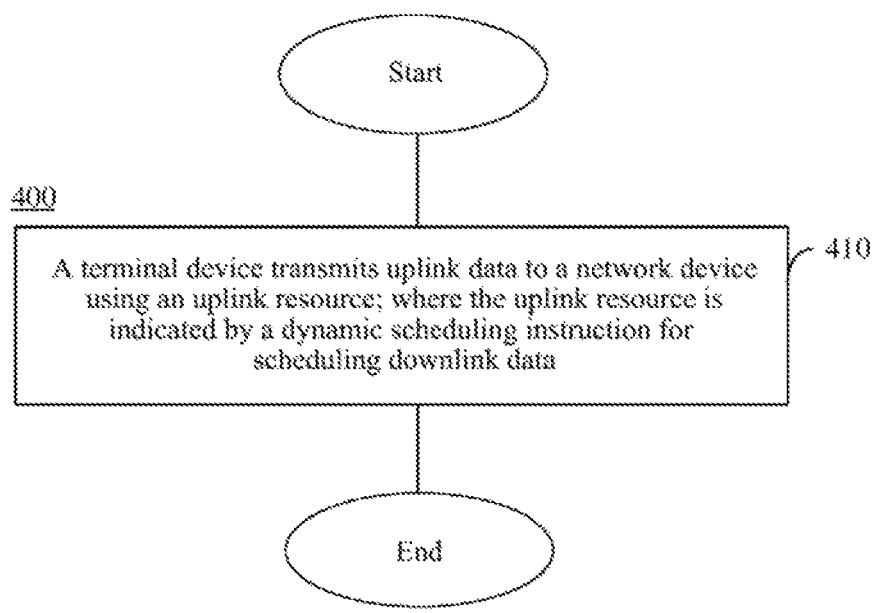
FIG. 4 is a schematic diagram of a wireless communication method provided by an embodiment of the present disclosure.

FIG. 4 is a schematic diagram of a wireless communication method 400 according to an embodiment of the present disclosure. As shown in FIG. 4, the method 400 includes at least part of the following contents.

In 410, a terminal device transmits uplink data to a network device using an uplink resource; where the uplink resource is indicated by a dynamic scheduling instruction for scheduling downlink data.

Figure 5:
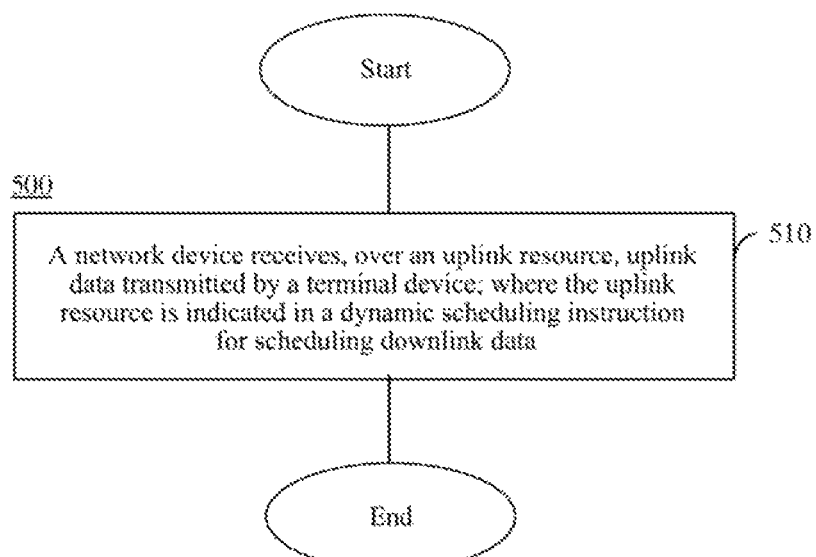
FIG. 5 is a schematic diagram of a wireless communication method provided by an embodiment of the present disclosure.

FIG. 5 is a schematic diagram of a wireless communication method 500 according to an embodiment of the present disclosure. As shown in FIG. 5, the method 50 includes at least part of the following contents In 510, a network device receives, over an uplink resource, uplink data transmitted by a terminal device, where the uplink resource is indicated in a dynamic scheduling instruction for scheduling downlink data.

To more clearly understand the present disclosure, the embodiment of the present disclosure will be described hereunder in detail. The following description can be applied to both the method 400 and the method 500.

Optionally, the embodiment of the present disclosure can be used for an unlicensed frequency band and a licensed frequency band.

Optionally, the uplink data mentioned in the embodiment of the present disclosure may be data carried in a physical uplink shared channel (Physical Uplink Shared Channel, PDSCH), and may be data carried in an uplink control channel (for example, uplink control information (Uplink Control Information, UCI)), and may also be an uplink reference signal (for example, a sounding reference signal (Sounding Reference Signal, SRS)), or a channel or a signal transmitted during a physical random access procedure (for example, Message 3).

Optionally, the dynamic scheduling instruction may be DCI, where the DCI may be configured to schedule downlink data (it may be DCI for scheduling downlink data received the last time before transmission of the uplink data), and the DCI may further carry information about the uplink resource. Specifically, the DCI carries a bit indicating the uplink resource. For example, by means of bit mapping, one uplink resource in a resource set may be indicated, or an offset of the uplink resource relative to a specific resource (for example, an RRC semi-statically configured periodic resource or a resource for the downlink data scheduled by the DCI) is indicated.

It should be understood that the DCI for scheduling the downlink data may also indicate the uplink resource in other manners. For example, the DCI may be distinguished for whether to indicate the uplink resources by different scrambling codes or bits that do not carry different values, and when there is a function of indicating the uplink resource, the terminal device may determine the uplink resource according to some other protocol based preset or RRC semi-statically configured information (for example, an offset of the uplink resource relative to a specific resource (for example, a resource for the downlink data scheduled by the DCI)).

Therefore, in the embodiment of the present disclosure, the dynamic scheduling instruction for scheduling the downlink data may indicate the uplink resource over which the uplink data is transmitted, which may save signaling overheads.

The wireless communication method according to the embodiment of the present disclosure is described above with reference to FIG. 2 to FIG. 5, and a wireless communication device according to an embodiment of the present disclosure will be described hereunder.

Figure 6:
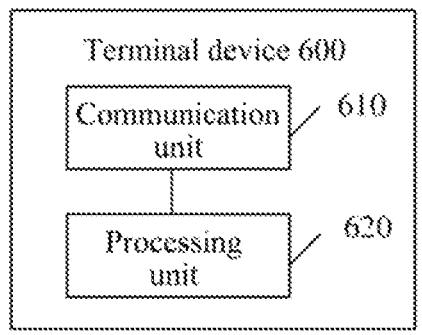
FIG. 6 is a schematic diagram of a terminal device provided by an embodiment of the present disclosure.

FIG. 6 is a schematic block diagram of a terminal device 600 according to an embodiment of the present disclosure. The terminal device 600 includes a communication unit 610, configured to:

transmit uplink data to a network device using at least one of multiple uplink resources; where the multiple uplink resources are indicated by a dynamic scheduling instruction.

Optionally, as shown in FIG. 6, the terminal device 600 further includes a processing unit 620, configured to:

determine a first uplink resource from the multiple uplink resources;

the communication unit is further configured to:

perform a listening before talking LBT operation on the first uplink resource; and under a circumstance that the LBT operation performed on the first uplink resource is successful, transmit the uplink data using the first uplink resource.

Optionally, in an embodiment of the present disclosure, the processing unit 620 is further configured to:

determine the first uplink resource from the multiple uplink resources based on at least one of the following: an ID of the terminal device, a code rate of each of the multiple uplink resources, an index of a carrier to which each of the multiple uplink resources belongs, and an index of a band width part to which each of the multiple uplink resources belongs.

Optionally, in an embodiment of the present disclosure, the processing unit 620 is further configured to:

under a circumstance that the LBT operation performed on the first uplink resource is unsuccessful, determine a second uplink resource from the multiple uplink resources:

the communication unit is further configured to:

perform an LBT operation on the second uplink resource; and under a circumstance that the LBT operation performed on the second uplink resource is successful, transmit the uplink data using the second uplink resource.

Optionally, in an embodiment of the present disclosure, the communication unit 610 is further configured to:

under a circumstance that the uplink data is transmitted using the first uplink resource, repeatedly transmit the uplink data using a third uplink resource from the multiple uplink resources, where a start position of the third uplink resource in a time domain is later than a start position of the first uplink resource in a time domain.

Optionally, in an embodiment of the present disclosure, the third uplink resource is located in a first time range in the time domain, and a start time-domain position of the first time range is the start time-domain position of the first uplink resource, and a time length between the start time-domain position and an end time-domain position of the first time range is less than or equal to a predetermined time length.

Optionally, in an embodiment of the present disclosure, the predetermined time length is a maximum channel occupancy time MCOT.

Optionally, in an embodiment of the present disclosure, the communication unit 610 is further configured to:

under a circumstance that the uplink data is transmitted using the first uplink resource, discard an uplink resource whose time-domain position is later than the first uplink resource from the multiple uplink resources.

Optionally, in an embodiment of the present disclosure, the communication unit 610 is further configured to:

perform LBT operations on the multiple uplink resources, respectively; and transmit the uplink data using an uplink resource whose LBT operation is successful from the multiple uplink resources.

Optionally, in an embodiment of the present disclosure, the multiple uplink resources do not overlap in the time domain.

Optionally, in an embodiment of the present disclosure, the communication unit 610 is further configured to:

perform LBT operations simultaneously on uplink resources with a same time-domain position and different frequency-domain positions; and transmit the uplink data using an uplink resource whose LBT operation is successful from the uplink resources with the same time-domain position and different frequency-domain positions.

Optionally, in an embodiment of the present disclosure, the dynamic scheduling instruction indicates the multiple uplink resources in a resource set by means of bit mapping.

Optionally, in an embodiment of the present disclosure, the dynamic scheduling instruction includes a resource position of one of the multiple uplink resources.

Optionally, as shown in FIG. 6, the terminal device 600 further includes a processing unit 620 configured to:

determine the resource position of the one uplink resource from the dynamic scheduling instruction; and determine, based on the resource position of the one uplink resource and an offset between the multiple uplink resources, other at least part of uplink resources other than the one uplink resource from the multiple uplink resources.

Optionally, in an embodiment of the present disclosure, the dynamic scheduling instruction includes: an offset of one of the multiple uplink resources relative to a specific resource and an offset between the multiple uplink resources.

Optionally, as shown in FIG. 6, the terminal device 600 further includes a processing unit, configured to:

determine at least part of the multiple uplink resources based on the offset of the one uplink resource relative to the specific resource and the offset between the multiple uplink resources, and a resource position of the specific resource.

Optionally, in an embodiment of the present disclosure, the specific resource is one of periodic uplink resources indicated by RRC signaling.

Optionally, in an embodiment of the present disclosure, the dynamic scheduling instruction is downlink control information DCI signaling or a random access response.

Optionally, in an embodiment of the present disclosure, when the dynamic scheduling instruction is the random access response, the multiple uplink resources are carried in one sub-protocol data unit PDU in one random access response, or are carried in multiple sub-PDUs in the random access response one by one.

Optionally, in an embodiment of the present disclosure, the DCI is DCI for scheduling the uplink data.

Optionally, in an embodiment of the present disclosure, the DCI is DCI for scheduling downlink data before the uplink data.

Optionally, in an embodiment of the present disclosure, the DCI carries bits indicating the multiple uplink resources.

Optionally, in an embodiment of the present disclosure, the multiple uplink resources belong to an unlicensed frequency band.

It should be understood that the terminal device 600 may implement corresponding operations implemented by the terminal device in the foregoing method embodiments, for the sake of brevity, details will not be described here again.

Figure 7:
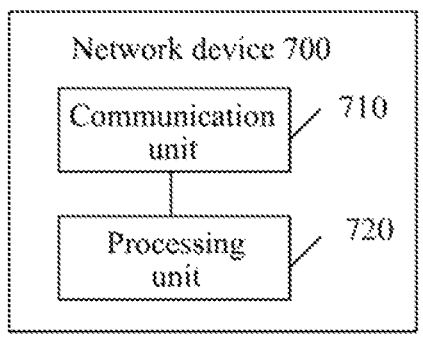
FIG. 7 is a schematic diagram of a network device provided by an embodiment of the present disclosure.

FIG. 7 is a schematic block diagram of a network device 700 according to an embodiment of the present disclosure. The network device 700 includes a communication unit 710, configured to:

receive, over at least one of multiple uplink resources, uplink data transmitted by a terminal device, where, the multiple uplink resources are indicated in a dynamic scheduling instruction.

Optionally, in an embodiment of the present disclosure, the network device 70) further includes a processing unit 720, configured to:

determine a first uplink resource from the multiple uplink resources;

the communication unit is further configured to perform, starting from the first uplink resource, a detection on the uplink data over the at least one uplink resource to obtain the uplink data.

Optionally, in an embodiment of the present disclosure, the processing unit 720 is further configured to:

determine the first uplink resource from the multiple uplink resources based on at least one of the following: an ID of the terminal device, a code rate of each of the multiple uplink resources, an index of a carrier to which each of the multiple uplink resources belongs, and an index of a band width part to which each of the multiple uplink resources belongs.

Optionally, in an embodiment of the present disclosure, the communication unit 710 is further configured to:

under a circumstance that the uplink data is not detected over the first uplink resource, perform a detection over a second uplink resource from the multiple uplink resources to obtain the uplink data.

Optionally, in an embodiment of the present disclosure, the communication unit 710 is further configured to:

under a circumstance that the uplink data is detected over the first uplink resource, detect, over the third uplink resource, the uplink data that is repeatedly transmitted, where a start position of the third uplink resource in a time domain is later than a start position of the first uplink resource in a time domain.

Optionally, in an embodiment of the present disclosure, the third uplink resource is located in a first time range in the time domain, and a start time-domain position of the first time range is the start time-domain position of the first uplink resource, and a time length between the start time-domain position and an end time-domain position of the first time range is less than or equal to a predetermined time length.

Optionally, in an embodiment of the present disclosure, the predetermined time length is a maximum channel occupancy time MCOT.

Optionally, in an embodiment of the present disclosure, the communication unit 710 is further configured to:

under a circumstance that the uplink data is detected over the first uplink resource, no longer perform a detection on the uplink data over other time domain resources whose time-domain position is later than the first uplink resource from the multiple uplink resources.

Optionally, in an embodiment of the present disclosure, the communication unit 710 is further configured to:

perform detections on the uplink data over the multiple uplink resources, respectively.

Optionally, in an embodiment of the present disclosure, the multiple uplink resources do not overlap in the time domain.

Optionally, in an embodiment of the present disclosure, the communication unit 710 is further configured to:

perform detections on the uplink data simultaneously over uplink resources with a same time-domain position and different frequency-domain positions.

Optionally, in an embodiment of the present disclosure, the dynamic scheduling instruction indicates the multiple uplink resources in a resource set by means of bit mapping.

Optionally, in an embodiment of the present disclosure, the dynamic scheduling instruction includes a resource position of one of the multiple uplink resources;

the network device 700 includes a processing unit 720, configured to:

determine, based on the resource position of the one uplink resource and an offset between the multiple uplink resources, other at least part of uplink resources other than the one uplink resource from the multiple uplink resources.

Optionally, in an embodiment of the present disclosure, the dynamic scheduling instruction includes: an offset of a resource position of one of the multiple uplink resources relative to a specific resource and an offset between the multiple uplink resources;

the network device 700 includes a processing unit 720, configured to:

determine at least part of the multiple uplink resources based on the offset of the one uplink resource relative to the specific resource and the offset between the multiple uplink resources, and a resource position of the specific resource.

Optionally, in an embodiment of the present disclosure, the specific resource is one of periodic uplink resources indicated by RRC signaling.

Optionally, in an embodiment of the present disclosure, the dynamic scheduling instruction is downlink control information DCI signaling or a random access response.

Optionally, in an embodiment of the present disclosure, when the dynamic scheduling instruction is the random access response, the multiple uplink resources are carried in one sub-protocol data unit PDU in one random access response, or are carried in multiple sub-PDUs in the random access response one by one.

Optionally, in an embodiment of the present disclosure, the DCI is DCI for scheduling the uplink data.

Optionally, in an embodiment of the present disclosure, the DCI is DCI for scheduling downlink data before the uplink data.

Optionally, in an embodiment of the present disclosure, the DCI carries bits indicating the multiple uplink resources.

Optionally, in an embodiment of the present disclosure, the multiple uplink resources belong to an unlicensed frequency band It should be understood that the network device 700 may implement corresponding operations implemented by the network device in the foregoing method embodiments, for the sake of brevity, details will not be described here again.

Figure 8:
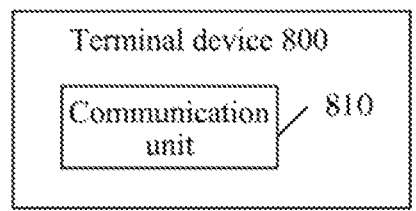
FIG. 8 is a schematic diagram of a terminal device provided by an embodiment of the present disclosure.

FIG. 8 is a schematic diagram of a terminal device 800 according to an embodiment of the present disclosure. The terminal device 800 includes a communication unit 810, configured to:

transmit uplink data to a network device using an uplink resource, where the uplink resource is indicated by a dynamic scheduling instruction for scheduling downlink data.

It should be understood that the terminal device 800 may implement corresponding operations implemented by the terminal device in the foregoing method embodiments, for the sake of brevity, details will not be described here again.

Figure 9:
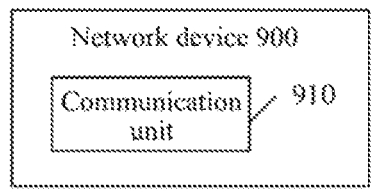
FIG. 9 is a schematic diagram of a network device provided by an embodiment of the present disclosure.

FIG. 9 is a schematic diagram of a network device 900 according to an embodiment of the present disclosure. The network device 900 includes a communication unit 910, configured to:

receive, over an uplink resource, uplink data transmitted by a terminal device, where the uplink resource is indicated by a dynamic scheduling instruction for scheduling downlink data.

It should be understood that the network device 900 may implement corresponding operations implemented by the network device in the foregoing method embodiments, for the sake of brevity, details will not be described here again.

Figure 10:
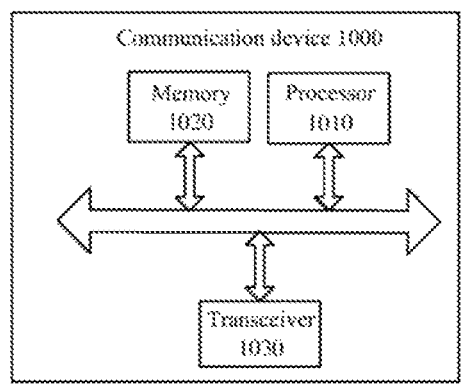
FIG. 10 is a schematic diagram of a communication device provided by an embodiment of the present disclosure.

FIG. 10 is a schematic structural diagram of a communication device 1000 according to an embodiment of the present disclosure. The communication device 1000 show in FIG. 10 includes a processor 1010 which may call and run a computer program from a memory to implement a method in an embodiment of the present disclosure.

Optionally, as shown in FIG. 10, the communication device 1000 may further include a memory 1020. Where, the processor 1010 may call and run a computer program from the memory 1020 to implement a method in an embodiment of the present disclosure.

Where, the memory 1020 may be a separate device independent of the processor 1010 or may be integrated in the processor 1010.

Optionally, as shown in FIG. 10, the communication device 1000 may further include a transceiver 1030. The processor 1010 may control the transceiver 1030 to communicate with other devices, in particular, to transmit information or data to other devices, or receive information or data transmitted by other devices.

Where, the transceiver 1030 may include a transmitter and a receiver. The transceiver 1030 may further include an antenna, and the antenna may be one or multiple in number.

Optionally, the communication device 1000 may be specifically a terminal device of an embodiment of the present disclosure, and the communication device 1000 may implement corresponding operations implemented by a terminal device in a respective method of an embodiment of the present disclosure, for the sake of brevity, details will not be described here again.

Optionally, the communication device 1000 may be specifically a network device of an embodiment of the present disclosure, and the communication device 1000 may implement corresponding operations implemented by a network device in a respective method of an embodiment of the present disclosure, for the sake of brevity, details will not be described here again.

Figure 11:
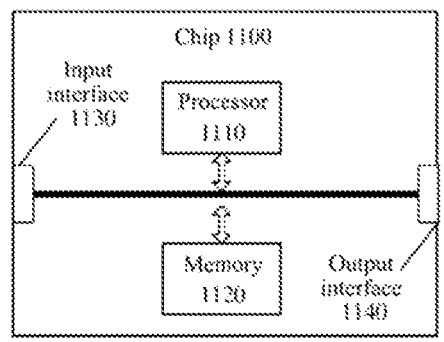
FIG. 11 is a schematic diagram of a chip provided by an embodiment of the present disclosure.

FIG. 11 is a schematic structural diagram of a chip of an embodiment of the present disclosure. The chip 1100 shown in FIG. 11 includes a processor 1110 which may call and run a computer program from a memory to implement a method in an embodiment of the present disclosure.

Optionally, as shown by FIG. 11, the chip 1100 may further include a memory 1120. Where, the processor 1110 may call and run a computer program from a memory 1120 to implement a method in an embodiment of the present disclosure.

Where, the memory 1120 may be a separate device independent of the processor 1110 or may be integrated in the processor 1110.

Optionally, the chip 1100 may further include an input interface 1130. Where, the processor 1110 may control the input interface 1130 to communicate with other devices or chips, in particular, may acquire information or data transmitted by other devices or chips.

Optionally, the chip 1100 may further include an output interface 1140. Where, the processor 1110 may control the output interface 1140 to communicate with other devices or chips, in particular, may output information or data to other devices or chips.

Optionally, the chip can be applied to a terminal device in an embodiment of the present disclosure; moreover, and the chip may implement corresponding processes implemented by a terminal device in a respective method of an embodiment of the present disclosure. For brevity, details will not be described herein again.

Optionally, the chip can be applied to a network device in an embodiment of the present disclosure; moreover, and the chip may implement corresponding processes implemented by a network device in a respective method of an embodiment of the present disclosure. For brevity, details will not be described herein again.

It should be understood that the chip mentioned in the embodiment of the present disclosure may also be termed as a system level chip, a system chip, a chip system or a system-on-chip, etc.

Figure 12:
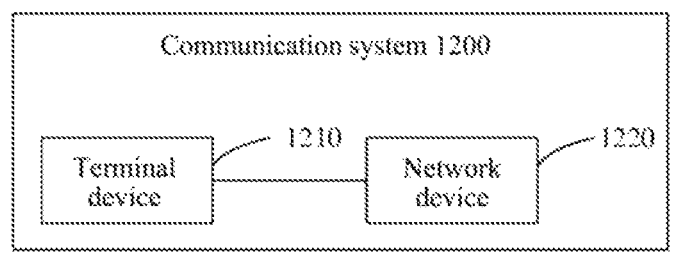
FIG. 12 is a schematic diagram of a communication system provided by an embodiment of the present disclosure.

FIG. 12 is a schematic block diagram of a communication system 1200 provided by an embodiment of the present disclosure. As shown in FIG. 12, the communication system 1200 includes a terminal device 1210 and a network device 1220.

Where, the terminal device 1210 may be configured to implement corresponding functions implemented by a terminal device in a method as described above, and, the network device 1220 may be configured to implement corresponding functions implemented by a network device in a method as described above, for the sake of brevity, details will not be described here again.

It should be understood that the processor in the embodiment of the present disclosure may be an integrated circuit chip with signal processing capabilities. During implementations, each step of the foregoing method embodiments may be completed by an integrated logic circuit of hardware in the processor or an instruction in a form of software. The above processor may be a general-purpose processor, a digital signal processor (Digital Signal Processor, DSP), an disclosure specific integrated circuit (Disclosure Specific Integrated Circuit, ASIC), a field programmable gate array (Field Programmable Gate Array, FPGA) or other programmable logic devices, discrete gate or transistor logic devices, discrete hardware components. The respective methods, steps, and logical block diagrams disclosed in the embodiments of the present disclosure may be implemented or performed. The general purpose processor may be a microprocessor or the processor may also be any conventional processor or the like. The steps of the methods disclosed in conjunction with the embodiments of the present disclosure may be directly embodied as being performed and completed by the hardware decoding processor, or being performed and completed by a combination of hardware and software modules in the decoding processor. The software module may be located in a storage medium mature in the art, such as a random access memory, a flash memory, a read only memory, a programmable read only memory, or an electrically erasable programmable memory, a register, or the like. The storage medium is located in the memory. The processor reads information in the memory and completes the steps of the above methods in combination with its hardware.

It can be understood that the memory in the embodiments of the present disclosure may be a volatile memory or a non-volatile memory, or may include both the volatile memory and the non-volatile memory. Where, the non-volatile memory may be a read-only memory (Read-Only Memory, ROM), a programmable read only memory (Programmable ROM, PROM), or an erasable programmable read only memory (Erasable PROM, EPROM), an electrically erasable programmable read only memory (Electrically EPROM, EEPROM) or a flash memory. The volatile memory may be a random access memory (Random Access Memory, RAM), which is used as an external cache. By way of exemplary but not restrictive illustration, many forms of RAMs may be available, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM) and a direct Rambus random access memory (Direct Rambus RAM, DR RAM). It should be noted that the memories of the systems and methods described herein are intended to include, but are not limited to these and any other suitable types of memories.

It should be understood that the above memory is exemplary but not restrictive illustration, for example, the memory in the embodiment of the present disclosure may also be a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synch link dynamic random access memory (synch link DRAM, SLDRAM) and a direct Rambus random access memory (Direct Rambus RAM, DR RAM), etc. That is to say, the memory in the embodiment of the present disclosure is intended to include, but is not limited to these and any other suitable types of memories.

An embodiment of the present disclosure further provides a computer readable storage medium for storing a computer program.

Optionally, the computer readable storage medium may be applied to a network device in an embodiment of the present disclosure, and the computer program enables a computer to execute corresponding processes implemented by a network device in a respective method of an embodiment of the present disclosure. For the sake of brevity, details will not be described here again.

Optionally, the computer readable storage medium may be applied to a mobile terminal/a terminal device in an embodiment of the present disclosure, and the computer program enables a computer to execute corresponding processes implemented by a mobile terminal/a terminal device in a respective method of an embodiment of the present disclosure. For the sake of brevity, details will not be described here again.

An embodiment of the present disclosure further provides a computer program product including a computer program instruction.

Optionally, the computer program product may be applied to a network device in an embodiment of the present disclosure, and the computer program instruction enables a computer to execute corresponding processes implemented by a network device in a respective method of an embodiment of the present disclosure. For the sake of brevity, details will not be described here again.

Optionally, the computer program product may be applied to a mobile terminal/a terminal device in an embodiment of the present disclosure, and the computer program instruction enables a computer to execute corresponding processes implemented by a mobile terminal/a terminal device in a respective method of an embodiment of the present disclosure. For the sake of brevity, details will not be described here again.

An embodiment of the present disclosure further provides a computer program.

Optionally, the computer program may be applied to a network device in an embodiment of the present disclosure. The computer program which, when running on a computer, enables the computer to execute corresponding processes implemented by a network device in a respective method of an embodiment of the present disclosure. For the sake of brevity, details will not be described here again.

Optionally, the computer program may be applied to a mobile terminal/a terminal device in an embodiment of the present disclosure. The computer program which, when running on a computer, enables the computer to execute corresponding processes implemented by a mobile terminal/a terminal device in a respective method of an embodiment of the present disclosure. For the sake of brevity, details will not be described here again.

It may be known to persons of ordinary skill in the art that, the units and the algorithm steps of each example that are described with reference to the embodiments disclosed herein may be implemented by electronic hardware or a combination of computer software and electronic hardware. Whether these functions are performed by hardware or software method depends on specific disclosures and design constraints of the technical solutions. Persons skilled in the art may implement the described functions by using different methods for each specific disclosure, but such implementation should not be regarded as going beyond the scope of the present disclosure.

It may be clearly understood by a person skilled in the art that, for the purpose of convenient and brief description, reference may be made to the corresponding processes in the foregoing method embodiments for detailed working processes of the foregoing systems, apparatuses, and units, and details will not be described herein again.

In several embodiments provided in the present disclosure, it should be understood that the disclosed systems, apparatuses, and methods may be implemented in other manners. For example, the described apparatus embodiments are merely exemplary. For instance, the division of the units is merely a division of logical functions and there may be other divisions during actual implementations. For instance, multiple units or components may be combined or integrated into another system, or some features may be omitted or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on multiple network units. Apart or all of the units may be selected according to actual needs to achieve the objectives of the solutions in the embodiments.

In addition, respective functional units in the respective embodiments of the present disclosure may be integrated into one processing unit, or respective units may exist alone physically, or two or more units are integrated into one unit.

If implemented in a form of a software functional unit and sold or used as an independent product, the functions may be stored in a computer readable storage medium. Based on such an understanding, the technical solutions of the present disclosure essentially, or the part contributing to the prior art, or a part of the technical solutions may be implemented in a form of a software product. The computer software product is stored in a storage medium, and includes several instructions for enabling a computer device (which may be a personal computer, a server, or a network device, etc.) to perform all or a part of the steps of the methods described in respective embodiments of the present disclosure. And the foregoing storage medium includes: various mediums that can store program codes, such as a USB flash disk, a mobile hard disk, a read-only memory (Read-Only Memory) ROM, a random access memory (Random Access Memory, RAM), a magnetic disk, or an optical disc, etc.

The above descriptions are merely specific embodiments of the present disclosure, but the protection scope of the present disclosure is not limited thereto. Any modification or replacement that may be readily conceived by any persons skilled in the art within the technical scope disclosed in the present disclosure should fall into the protection scope of the present disclosure. Thus, the protection scope of the present disclosure shall be subject to the protection scope of the claims.

What is claimed is:

1. A wireless communication method, comprising:
transmitting, by a terminal device, uplink data to a network device using at least one of multiple uplink resources;
wherein the multiple uplink resources are indicated by a dynamic scheduling instruction;
wherein the transmitting the uplink data using at least one of the multiple uplink resources comprises:
determining a first uplink resource from the multiple uplink resources;
performing a listening before talking (LBT) operation on the first uplink resource; and
under a circumstance that the LBT operation performed on the first uplink resource is successful, transmitting the uplink data using the first uplink resource;
wherein the transmitting the uplink data using at least one of the multiple uplink resources further comprises:
under a circumstance that the uplink data is transmitted using the first uplink resource, repeatedly transmitting the uplink data using a third uplink resource from the multiple uplink resources, wherein a start position of the third uplink resource in a time domain is later than a start position of the first uplink resource in a time domain;
wherein the determining the first uplink resource from the multiple uplink resources comprises:
determining the first uplink resource from the multiple uplink resources based on at least one of the following: an ID of the terminal device and a code rate of each of the multiple uplink resources;
wherein the dynamic scheduling instruction comprises: an offset of one of the multiple uplink resources relative to a specific resource and an offset between the multiple uplink resources; and the method further comprises:
determining at least part of the multiple uplink resources based on the offset of the one uplink resource relative to the specific resource and the offset between the multiple uplink resources, and a resource position of the specific resource;
wherein the specific resource is one of periodic uplink resources indicated by Radio Resource Control (RRC) signaling.

2. The method according to claim 1, wherein the determining the first uplink resource from the multiple uplink resources further comprises:
determining the first uplink resource from the multiple uplink resources further based on at least one of the following: index of a carrier to which each of the multiple uplink resources belongs and an index of a band width part to which each of the multiple uplink resources belongs.

3. The method according to claim 1, wherein the transmitting the uplink data using at least one of the multiple uplink resources further comprises:
under a circumstance that the LBT operation performed on the first uplink resource is unsuccessful, determining a second uplink resource from the multiple uplink resources;
performing an LBT operation on the second uplink resource; and
under a circumstance that the LBT operation performed on the second uplink resource is successful, transmitting the uplink data using the second uplink resource.

4. The method according to claim 1, wherein the third uplink resource is located in a first time range in the time domain, and a start time-domain position of the first time range is the start time-domain position of the first uplink resource, and a time length between the start time-domain position and an end time-domain position of the first time range is less than or equal to a predetermined time length; wherein the predetermined time length is a maximum channel occupancy time (MCOT).

5. The method according to claim 1, further comprising:
under a circumstance that the uplink data is transmitted using the first uplink resource, discarding an uplink resource whose time-domain position is later than the first uplink resource from the multiple uplink resources.

6. The method according to claim 1, wherein the transmitting the uplink data using at least one of the multiple uplink resources comprises:
performing LBT operations on the multiple uplink resources, respectively; and
transmitting the uplink data using an uplink resource whose LBT operation is successful from the multiple uplink resources.

7. The method according to claim 1, wherein the multiple uplink resources do not overlap in the time domain.

8. The method according to claim 1, wherein the transmitting the uplink data using at least one of the multiple uplink resources comprises:
performing LBT operations simultaneously on uplink resources with a same time-domain position and different frequency-domain positions; and
transmitting the uplink data using an uplink resource whose LBT operation is successful from the uplink resources with the same time-domain position and different frequency-domain positions.

9. The method according to claim 1, wherein the dynamic scheduling instruction indicates the multiple uplink resources in a resource set by means of bit mapping.

10. The method according to claim 1, wherein the dynamic scheduling instruction is downlink control information (DCI) signaling or a random access response;
wherein when the dynamic scheduling instruction is the random access response, the multiple uplink resources are carried in one sub-protocol data unit (PDU) in one random access response, or are carried in multiple sub-PDUs in the random access response one by one;
wherein the DCI is DCI for scheduling the uplink data.

11. The method according to claim 10, wherein the DCI is DCI for scheduling downlink data before the uplink data; wherein the DCI carries bits indicating the multiple uplink resources.

12. The method according to claim 1, wherein the multiple uplink resources belong to an unlicensed frequency band.

13. A wireless communication method, comprising:
receiving, by a network device over at least one of multiple uplink resources, uplink data transmitted by a terminal device,
wherein, the multiple uplink resources are indicated in a dynamic scheduling instruction;
wherein the receiving, by the network device over at least one of the multiple uplink resources, the uplink data transmitted by the terminal device comprises:

determining a first uplink resource from the multiple uplink resources; and performing, starting from the first uplink resource, a detection on the uplink data over the at least one uplink resource to obtain the uplink data;

wherein the receiving, by the network device over at least one of the multiple uplink resources, the uplink data transmitted by the terminal device further comprises:

under a circumstance that the uplink data is detected over the first uplink resource, detecting, over the third uplink resource, the uplink data that is repeatedly transmitted, wherein a start position of the third uplink resource in a time domain is later than a start position of the first uplink resource in a time domain;

wherein the determining the first uplink resource from the multiple uplink resources comprises:

determining the first uplink resource from the multiple uplink resources based on at least one of the following: an ID of the terminal device and a code rate of each of the multiple uplink resources;

wherein the dynamic scheduling instruction comprises: an offset of one of the multiple uplink resources relative to a specific resource and an offset between the multiple uplink resources; and the method further comprises:

determining at least part of the multiple uplink resources based on the offset of the one uplink resource relative to the specific resource and the offset between the multiple uplink resources, and a resource position of the specific resource;

wherein the specific resource is one of periodic uplink resources indicated by Radio Resource Control (RRC) signaling.

14. A terminal device, comprising:

a processor and a memory, wherein the memory is configured to store a computer program, and the processor is configured to call and run the computer program stored in the memory to execute the method according to claim 1.

15. A network device, comprising:

a processor and a memory, wherein the memory is configured to store a computer program, and the processor is configured to call and run the computer program stored in the memory to execute the method according to claim 13.

16. A chip, comprising:

a processor, configured to call and run a computer program from a memory, which enables a device installed with the chip executes the method according to claim 1.

* * * * *